US011232172B2

(12) United States Patent
Mendes et al.

(10) Patent No.: US 11,232,172 B2
(45) Date of Patent: Jan. 25, 2022

(54) COLLABORATIVE WEB APPLICATION AND DATA SYSTEM

(71) Applicant: SAP SE, Walldorf (DE)

(72) Inventors: Willian Mendes, São Paulo (BR);
Eduardo Berlitz, Porto Alegre (BR);
Eduardo Carvalho, Rio de Janeiro (BR); Joachim Fitzer, Frankfurt (DE);
Reinhold Kautzleben, Karlsruhe (DE);
Alexandre Faltz, Porto Alegre (BR)

(73) Assignee: SAP SE, Walldorf (DE)

( * ) Notice: Subject to any disclaimer, the term of this patent is extended or adjusted under 35 U.S.C. 154(b) by 82 days.

(21) Appl. No.: 16/209,192

(22) Filed: Dec. 4, 2018

(65) Prior Publication Data
US 2020/0175090 A1 Jun. 4, 2020

(51) Int. Cl.
| | |
|---|---|
| G06F 17/00 | (2019.01) |
| G06F 16/958 | (2019.01) |
| G06F 16/957 | (2019.01) |
| H04L 29/08 | (2006.01) |
| G06F 16/23 | (2019.01) |
| G06F 40/14 | (2020.01) |

(52) U.S. Cl.
CPC .......... *G06F 16/972* (2019.01); *G06F 16/23* (2019.01); *G06F 16/9577* (2019.01); *G06F 40/14* (2020.01); *H04L 67/025* (2013.01)

(58) Field of Classification Search
CPC .... G06F 40/166; G06F 40/177; G06F 16/972; G06F 16/23; G06F 16/9577; G06F 40/14; H04L 67/025

See application file for complete search history.

(56) References Cited

U.S. PATENT DOCUMENTS

| | | | |
|---|---|---|---|
| 6,826,594 B1 * | 11/2004 | Pettersen ................ | H04L 29/06 709/203 |
| 7,302,444 B1 * | 11/2007 | Dunmore .............. | G06F 40/106 |
| 7,949,937 B2 * | 5/2011 | Wu ........................ | G06F 16/345 715/209 |
| 7,949,999 B1 * | 5/2011 | Willeford ................ | G06F 8/656 717/120 |
| 8,250,457 B2 | 8/2012 | Fainberg et al. | |
| 8,407,576 B1 | 3/2013 | Yin et al. | |

(Continued)

OTHER PUBLICATIONS

Hyvärinen, E., "Modern WordPress development tools," Metropolia University of Applied Sciences Bachelor of Engineering Information and Communication Technology Thesis, 54 pages total, Mar. 31, 2018.

(Continued)

*Primary Examiner* — Mohammed H Zuberi
(74) *Attorney, Agent, or Firm* — Sterne, Kessler, Goldstein & Fox P.L.L.C.

(57) ABSTRACT

Disclosed herein are system, method, and computer program product embodiments for providing a collaborative web application and data system. An embodiment operates by receiving a changed value to data presented in a first web interface with a first set of interface components. A data source is updated based on the changed value to include the changed value. A second web interface associated including a second set of interface components at least one of which is different from the first set of interface components is identified. An update to the second web interface is provided based on the changed value.

20 Claims, 4 Drawing Sheets

(56) References Cited

U.S. PATENT DOCUMENTS

| | | | |
|---|---|---|---|
| 8,458,612 B2 | 6/2013 | Chatterjee et al. | |
| 8,667,090 B2 | 3/2014 | Chhabra et al. | |
| 9,002,895 B2 | 4/2015 | Doig et al. | |
| 9,032,390 B2 | 5/2015 | Tsuk et al. | |
| 9,116,766 B2 | 8/2015 | Mall et al. | |
| 9,229,702 B1* | 1/2016 | Kapulkin | G06F 8/656 |
| 9,235,561 B2* | 1/2016 | Delaporte | G06F 40/186 |
| 9,424,333 B1* | 8/2016 | Bisignani | H04L 63/08 |
| 9,471,892 B2* | 10/2016 | Bramlett, Jr. | G06Q 10/06 |
| 9,491,222 B2 | 11/2016 | Shelest | |
| 9,760,343 B2 | 9/2017 | Noens et al. | |
| 9,857,959 B2 | 1/2018 | Dhawal | |
| 9,952,835 B2 | 4/2018 | Wang et al. | |
| 10,275,221 B2 | 4/2019 | Thattai et al. | |
| 10,402,049 B1 | 9/2019 | Lyman | |
| 10,536,521 B2 | 1/2020 | Haviv et al. | |
| 2004/0046789 A1 | 3/2004 | Inanoria | |
| 2007/0294631 A1* | 12/2007 | Wiseman | G06F 40/166 715/764 |
| 2008/0033876 A1* | 2/2008 | Goldman | G06Q 40/02 705/42 |
| 2009/0083641 A1* | 3/2009 | Christy | G06F 16/958 715/760 |
| 2009/0119578 A1* | 5/2009 | Relyea | G06F 9/451 715/234 |
| 2010/0100802 A1* | 4/2010 | Delaporte | G06F 16/168 715/217 |
| 2010/0131940 A1* | 5/2010 | Jazdzewski | G06F 8/71 717/170 |
| 2011/0107266 A1 | 5/2011 | Hegde et al. | |
| 2011/0302221 A1* | 12/2011 | Tobin | G06F 16/24575 707/805 |
| 2012/0144327 A1 | 6/2012 | Johnson et al. | |
| 2012/0266156 A1* | 10/2012 | Spivak | G06F 8/71 717/172 |
| 2012/0324418 A1 | 12/2012 | Fallon | |
| 2014/0047413 A1 | 2/2014 | Sheive et al. | |
| 2014/0282901 A1* | 9/2014 | Dwan | H04L 67/22 726/4 |
| 2015/0040103 A1 | 2/2015 | Nyisztor et al. | |
| 2015/0074644 A1* | 3/2015 | Oberheide | G06F 9/44505 717/122 |
| 2015/0100952 A1* | 4/2015 | Tornow | G06F 9/44536 717/170 |
| 2016/0070813 A1 | 3/2016 | Unter Ecker et al. | |
| 2016/0110667 A1 | 4/2016 | Clevenger | |
| 2016/0253171 A1 | 9/2016 | Zang et al. | |
| 2016/0378439 A1 | 12/2016 | Straub et al. | |
| 2017/0060562 A1* | 3/2017 | Lopez | G06F 8/60 |
| 2017/0091156 A9 | 3/2017 | Cook | |
| 2017/0154017 A1 | 6/2017 | Kristiansson et al. | |
| 2017/0315713 A1 | 11/2017 | Pennell et al. | |
| 2017/0344218 A1 | 11/2017 | Jann et al. | |
| 2018/0039506 A1* | 2/2018 | Wagner | G06F 9/44536 |
| 2018/0046602 A1 | 2/2018 | Sisson et al. | |
| 2018/0081642 A1 | 3/2018 | Alurralde Iturri et al. | |
| 2018/0173390 A1 | 6/2018 | Dunne et al. | |
| 2018/0181270 A1 | 6/2018 | Muramoto et al. | |
| 2018/0285328 A1 | 10/2018 | Pivato | |
| 2019/0012216 A1 | 1/2019 | Pennell et al. | |
| 2019/0057111 A1 | 2/2019 | Chung | |
| 2019/0065153 A1 | 2/2019 | Olsson | |
| 2019/0065155 A1 | 2/2019 | Varadarajan et al. | |
| 2019/0065156 A1 | 2/2019 | Varadarajan et al. | |
| 2019/0065157 A1 | 2/2019 | Varadarajan et al. | |
| 2019/0065158 A1 | 2/2019 | Varadarajan et al. | |
| 2019/0065159 A1 | 2/2019 | Varadarajan et al. | |
| 2019/0095179 A1 | 3/2019 | Straub | |
| 2019/0235843 A1 | 8/2019 | Wu et al. | |
| 2019/0278589 A1* | 9/2019 | Cook | G06F 8/65 |
| 2020/0012743 A1* | 1/2020 | Tucker | H04L 67/02 |
| 2020/0042578 A1 | 2/2020 | Wu et al. | |
| 2020/0133982 A1 | 4/2020 | Thangeswaran et al. | |
| 2020/0142660 A1 | 5/2020 | Borkar et al. | |
| 2020/0162359 A1 | 5/2020 | Borkar et al. | |
| 2020/0174800 A1 | 6/2020 | Berlitz et al. | |

OTHER PUBLICATIONS

Khalili, A., "Linked Data Reactor: a Framework for Building Reactive Linked Data Applications," Knowledge Representation and Reasoning Research Group Department of Computer Sciences, Vrije Universiteit Amsterdam, 13 pages, 2016.

Kuitinen, M., "Cross-Platform Mobile Application Development With React Native," Tampere University Faculty of Information Technology and Communication Sciences Bachelor's Thesis, 34 pages, Feb. 2019.

* cited by examiner

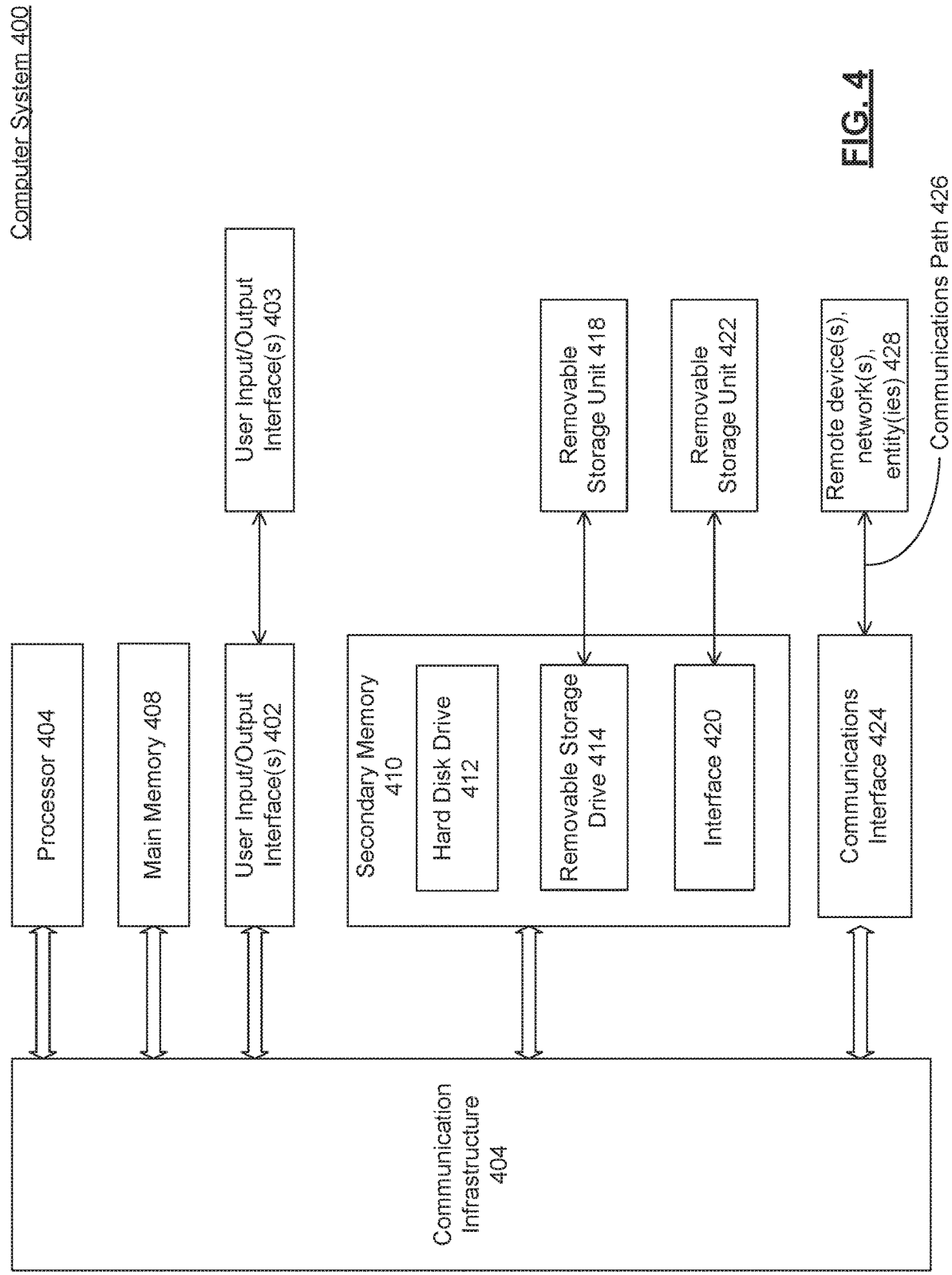

COLLABORATIVE WEB APPLICATION AND DATA SYSTEM

CROSS REFERENCE TO RELATED APPLICATIONS

This application is related to co-pending U.S. patent application Ser. No. 16/209,144, by Berlitz et al. "Web Component Design And Integration System," filed herewith which is hereby incorporated by reference in its entirety.

BACKGROUND

Webpages are often self-contained entities such that changes to an instance of a first webpage will not affect what is displayed on an instance of a second, different webpage. For example, if a user updates data on an instance of a first webpage, this data will not be reflected on an instance of a second webpage that is different from the first webpage. This is the case because there is no connection between the self-contained webpages.

BRIEF DESCRIPTION OF THE DRAWINGS

The accompanying drawings are incorporated herein and form a part of the specification.

FIG. 4 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing functionality for providing collaborative web applications and data.

Figure 1:
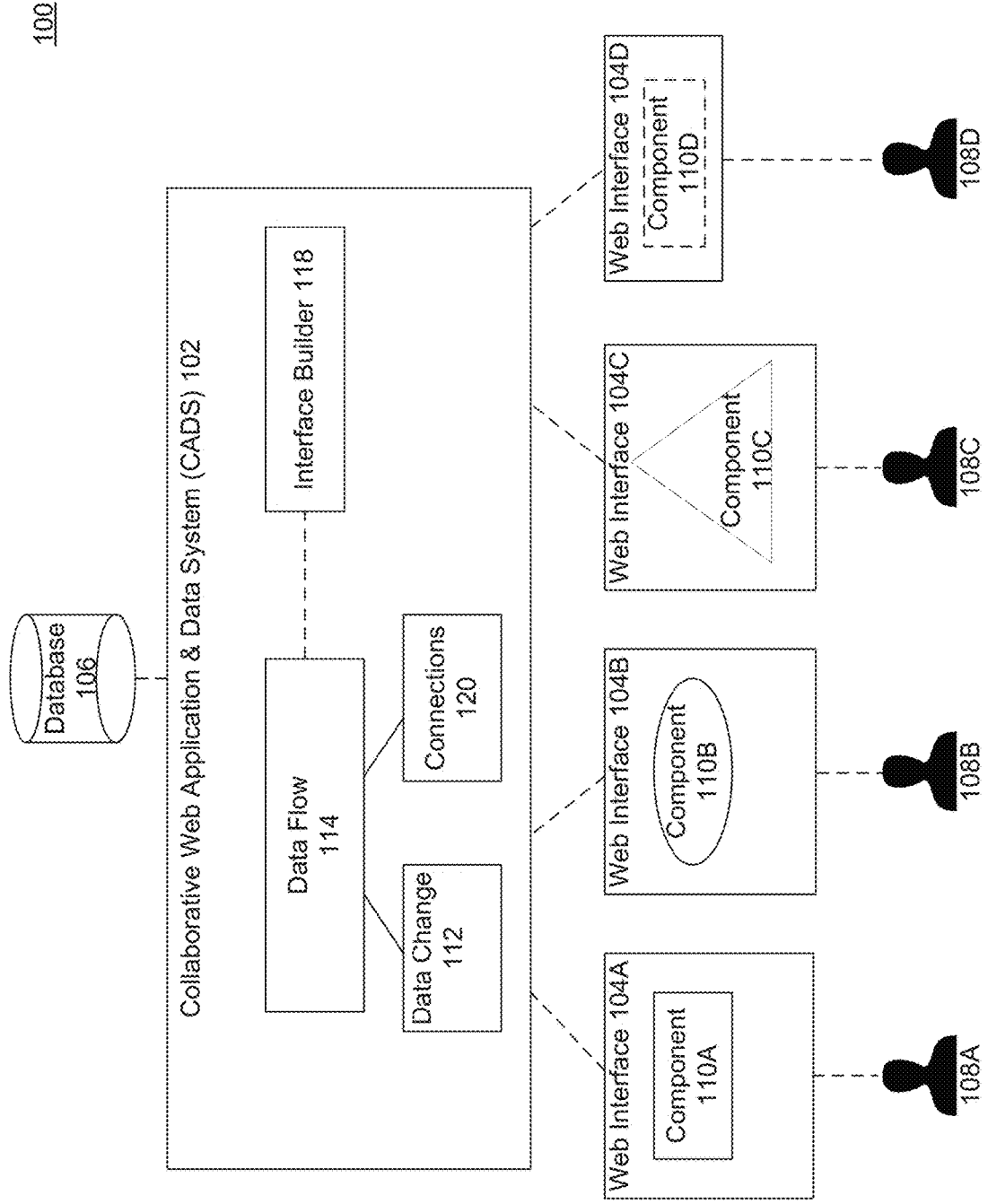
FIG. 1 is a block diagram illustrating example functionality for providing a collaborative web application and data system, according to some embodiments.

FIG. 1 is a block diagram 100 illustrating example functionality for providing a collaborative web application and data system, according to some embodiments. A collaborative web application and data system (CADS) 102 may provide for data synchronization and collaboration between different web interfaces 104 operating across one or more user devices.

Web interface 104 may include any document, program, or application that is executable by or configured for display within a web browser. In an embodiment, web interface 104 may include a webpage such as a hypertext markup language (HTML) or other markup language document. Web interface 104 may also execute or reference non-markup language objects or functions, such as JavaScript® functions. JavaScript® is an example technology that enables webpage pages to be interactive, and may support both event-driven functionality and object-oriented programming.

In an embodiment, web interfaces 104A-D may each be communicatively coupled to a database 106. Database 106 may include a data storage or repository for data that is accessible or modifiable by users 108A-D through web interfaces 104A-D, respectively. Database 106 may include tables with records (arranged in rows and columns) corresponding to the data that is provided for display on web interfaces 104.

Each webpage 104 may have its own unique format or look and feel, or may have its own component(s) 110 that displays and/or allows for the modification data. In an embodiment, web interfaces 104A-D may be different webpages across one or more websites that use or access at least a portion of data from database 106.

As used herein, webpages 104 and web interfaces 104 may be referring to instances of a particular webpage 104. For example, a designer may program or design a webpage 104. The webpage 104 may then be made available (on one or more servers) to multiple user devices or programs for simultaneous access, whereby each access may obtain its own copy or instance of the webpage 104. As discussed in greater detail below, these accesses or instances may be tracked as connections 120.

The data displayed in or used to generate web interfaces 104A-D may be retrieved from or across databases 106. The data may either be unique, such that none of the other interfaces 104 include the same data, or may be overlapping such that at least one other interface 104 includes the same data (e.g., retrieved from the same record) from database 106. For example, the name field from table 1 of database 106 may also be used in one or more of web interfaces 104B-D, and as such may constitute overlapping data. CADS 102 may provide for the real-time synchronization of overlapping data between different web interfaces 104, or instances thereof.

In some embodiments, the terms web interface 104 and webpage 104 may be used interchangeably herein. In an embodiment, components 110A-D of webpages 104 may display data and allow users 108 to add, remove, or change the data in an instance of the webpage 104. CADS 102 may synchronize changes in the webpage instance with database 106 and any other instances of any other webpages 104 that are accessing, displaying, or using the same data that was modified.

Components 110A-D may enable a user 108 to view, add, remove, or otherwise modify data values (that are stored on database 106) through web interface 104. In different embodiments, components 110 may include a text box, check box, slider, radio button, graph, table, or tool or icon on web interface 104 that enables a user to view or modify a data value through keyboard, mouse, or voice instructions.

In the example shown, each component 110A-D may display or provide access to at least one piece of data from database 106 that is displayed or used in one or more of the other interfaces 104. In an embodiment, different interfaces 104 may include the same components accessing the same data from database 106. For example, interface 104A and 104C may include the same chart with the same data. Or, for example, each webpage 104 may also include its own unique components 110 that uniquely displays or allows a user 108 to modify the data, and that is not included in any other interfaces 104.

CADS 102 may use a dataflow 114 to determine which data of database 106 is overlapping (to be synchronized across multiple interfaces 104) and which data is unique to a particular interface 104 and does not need cross-interface synchronization (but may still be synchronized with database 106). Data flow 114 may be a model of how data from database 106 is being distributed amongst the various devices or servers and/or how it is accessed or interacted with by various web interfaces 104A-D. In an embodiment, data flow 114 may indicate which interfaces 104 are accessing which tables or fields of database 106.

In an embodiment, an interface builder 118 may enable a programmer or developer to select or design a particular data flow 114 and then build webpages 104 on top of the data flow 114. As such, interface builder 118 may enable a programmer to quickly develop multiple webpages 104 each of which access or use the same underlying data flow 114. Then for example, data updates (or data changes 112) received from any interface 104 of a particular data flow 114 may be provided to interfaces 104 using the same data flow.

Figure 2:
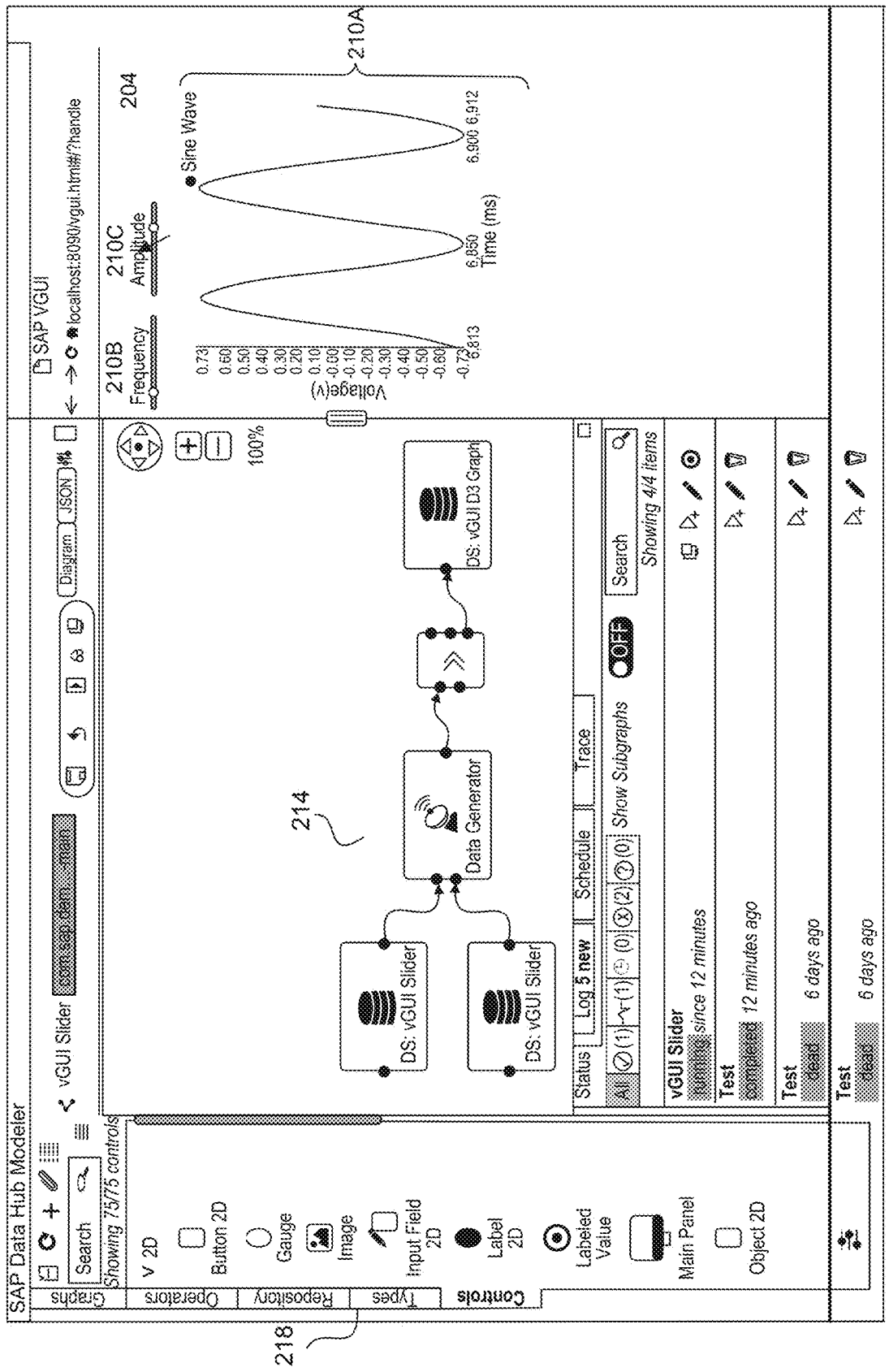
FIG. 2 is an example illustration of an interface builder for providing collaborative web applications and data functionality, according to some embodiments.

FIG. 2 is an example illustration 200 of an interface builder 218 for providing collaborative web applications and data functionality, according to some embodiments. FIG. 2 illustrates example features of FIG. 1, according to an embodiment.

Interface builder 218 may enable a user or programmer to drag-and-drop components corresponding to databases, data structures, or computing devices to arrange or organize an underlying data flow 214. Data flow 214 may indicate on which devices data of database 106 is stored, and/or how the data is updated or retrieved for interaction with web interfaces 104.

Interface builder 218 may enable a user to design web interfaces 104 that rely on, use, or reference the same underlying data flow 214. For example, interface builder 218 may enable a programmer to drag-and-drop user interface components 110 (and other visual display objects) onto a webpage 104 within the development environment.

Interface builder 218 may be pre-configured with connections between the selected components 110 and the underlying data structures (such as database 106) of data flow 214. Or, for example, interface builder 218 may enable a programmer to provide the connections to underlying data for new or customized components 210, and then make those components 210 available for drag and drop in building webpages 204. These features of CADS 102 may enable a user to quickly design webpages 104 without wasting time and computing cycles programing, debugging, and compiling both custom code for each component 110/210 and for the data connections for each new interface 104/204.

Web interface 204 illustrates an example of a web interface 104. Interface 204 may include a component 210A that includes a graph of data from database 106. Interface 204 may also include components (frequency and amplitude sliders) 210B and 210C that enable a user to view and change or manipulate the data that is illustrated in graph 210A using either or both of the sliders. In an embodiment, changes to the data using either slider 210B or 210C may be received by CADS 102 as data change 112 as illustrated in FIG. 1

CADS 102 may track or identify which web pages or web interfaces 104 share a data flow 114 corresponding to the data change 112. CADS 102 may update database 106 and the corresponding instances of webpages 104 which share the underlying data flow 114, or that are accessing/displaying the same data (that was changed 112). As referenced above, these instances may be tracked as connections 120.

Connections 120 may include a list of internet protocol (IP) addresses, media access control (MAC) address, user identifier, or active web socket connections. Connections 120 may indicate on which user devices active instances of the webpages 104 are included. CADS 102 may then provide data changes 112 to the devices or active instances of webpages 104 that share a dataflow 114. In an embodiment, CADS 102 may be configured to operate across one or more servers which are maintaining web socket connections to instances of web interfaces 104 across different devices.

In some embodiments, rather than limiting a synchronization of data to only instances of a single webpage, CADS 102 enables and provides synchronization across various instances of multiple, different webpages 104 (which may be sharing the same underlying data model or flow 114). For example, CADS 102 may enable different webpages 104A-C, including different components 110A-D, that access overlapping or the same data fields from one or more databases 106 to be synchronized, even if the data is being used in different ways.

In an embodiment, CADS 102 may determine from data flow 114 and/or connections 120 which devices or web interfaces 104 are accessing or using data corresponding to data change 112. CADS 102 may then provide, push, or otherwise make available data change 112 to the corresponding instances of those interfaces 104. In an embodiment, this may include updating an image using data of data change 112, and then providing a new image to webpages 104. As a result, data change 112 made on a first interface 104A may be visually reflected, in real-time, across different webpages or interfaces 104B, 104C which are accessing the same data.

For example, CADS 102 may receive a data change 112 when a user makes a change to the data displayed in web interface 104 using a component 110 which may be a spreadsheet document. For example, user 108A may update a 'City' value from "Washington, D.C." to "NYC." This change in value of 'City' may be received by CADS 102 as data change 112.

CADS 102 may then identify that web interface 104B is using 'City' (in a word processing document), and that web interface 104C includes a picture of the White House corresponding to the "Washington, D.C." value. CADS 102 may update the 'City' field in database 106 with "NYC" and provide the updated value to interfaces 104B, and an image of the Empire State Building to interface 104C. In an embodiment, interface 104D may be using the same data flow 114, but may not include the 'City' data value and so not be provided an update corresponding to data change 112.

Figure 3:
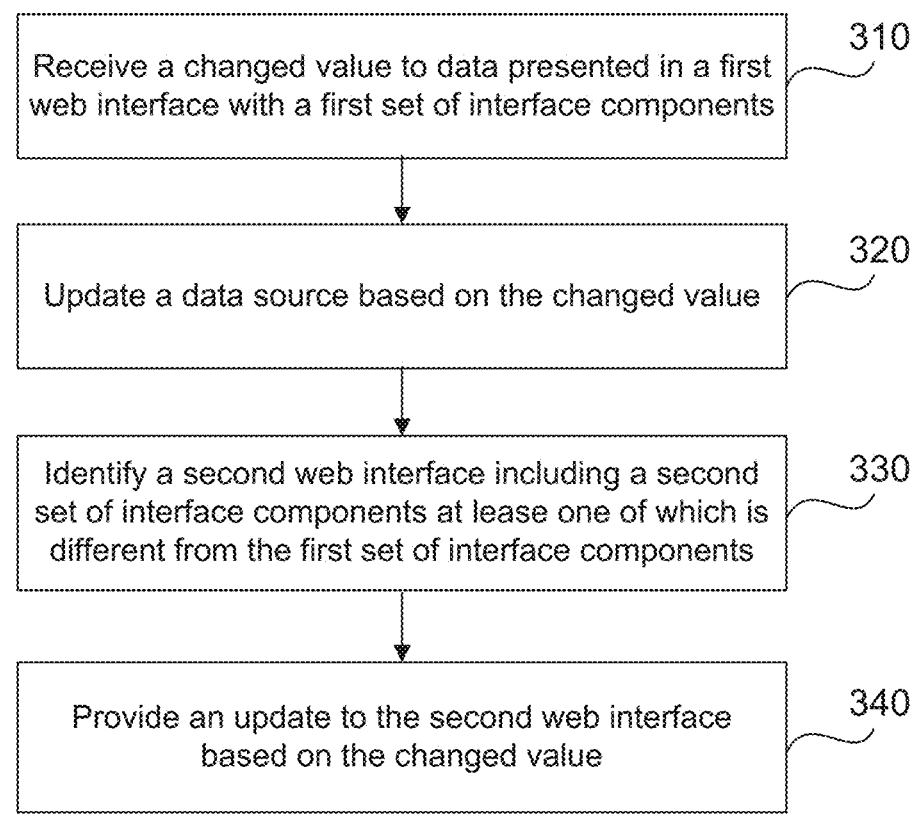
FIG. 3 is a flowchart illustrating example operations of a collaborative web application and data system, according to some embodiments.

FIG. 3 is a flowchart 300 illustrating example operations of a collaborative web application and data system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to those example embodiments.

In 310, a changed value to data presented in a first web interface with a first set of interface components is received. For example, CADS 102 may receive a data change 112 corresponding to an adjustment or change of component 110A from web interface 104A.

In 320, a data source including the data and a prior value to the change is updated. For example, CADS 102 may update the value across one or more records of database 106 from the original values to the changed values of data change 112. In another embodiment, the data change 112 may not be propagated to database 106 (due to a lack of permissions), but CADS 102 may nonetheless synchronize data change 112 with other interfaces 104, based on data flow 114, as described herein.

In 330, a second web interface comprising a second set of interface components, at least one of which is different from the first set of interface components, is identified. For example, CADS 102 may identify to which other interfaces 104R-D data change 112 is to be transmitted or provided based on a shared data flow 114 between the interfaces 104 and/or active connections 120.

In 340, an update to the second web interface based on the changed value is provided. For example, CADS 102 may provide data change 112 to the identified interfaces 104B-D that include the updated fields or data values.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   determining an original value is displayed on both a first web interface via a first interface component of the first web interface and a second web interface via a second interface component of the second web interface, wherein the first interface component is a different type of interface component than the second interface component, wherein both the first web interface and the second web interface are configured to receive a changed value to replace the original value, and wherein both the first interface component and the second interface component are configured to display the changed value, received via either the first web interface or the second web interface, in place of the original value;
   receiving, via the first web interface, the changed value to the original value of a plurality of values displayed on the first web interface;
   determining, from a data flow tracking which data of a database is used across the first web interface or the second web interface, that the original value is displayed on both the first web interface and the second web interface;
   updating the database based on the changed value, wherein after the updating the database includes the changed value;
   identifying, from the data flow, one or more devices accessing the second web interface including the first value; and
   providing the changed value to the identified one or more devices accessing the second web interface including the original value, wherein the original data value in the second web interface is updated to display the changed value.

2. The method of claim 1, wherein the changed value is received based on an interaction with the first interface component configured to enable a user to adjust a prior value of the data of the data source.

3. The method of claim 2, wherein the second interface component of the second web interface is configured to adjust the data of the data source, including both the prior value prior to the receiving, or the changed value after the providing.

4. The method of claim 3, further comprising:
   receiving a second changed value to the changed value via the second interface component displayed on the second web interface;
   updating the data source based on the subsequent changed value; and
   providing the subsequent update to the first web interface for display via the first interface component.

5. The method of claim 1, wherein the identifying comprises:
   identifying a plurality of web sockets communicatively coupled to the data source, to which a prior value has been provided.

6. The method of claim 5, wherein the transmitting comprises:
   providing the update to the plurality of web socket connections.

7. The method of claim 6, further comprising:
   identifying a particular web socket communicatively coupled to the data source, wherein the prior value was not provided to the particular web socket, and wherein the update is not provided to the particular web socket.

8. The method of claim 6, wherein at least two of the web socket connections are associated with a same computing device.

9. The method of claim 1, wherein the first web interface is an instance of a first webpage accessed by a first user, wherein the second web interface is an instance of a second webpage different from the first webpage and accessed by a second user, and wherein the instance of the second webpage is updated to include the changed value.

10. The method of claim 1, wherein the data flow includes a list of connections identifying the one or more devices accessing the second web interface, wherein the list of connections include one or more of an internet protocol address or media access control address identify the one or more devices.

11. The method of claim 1, wherein the first interface component and the second interface component each comprise one of a text box, slider, radio button, graph, table, or icon through which the original value is modifiable, and wherein the first interface component is different from the second interface component.

12. A system, comprising:
a memory; and
at least one processor coupled to the memory and configured to:
determine an original value is displayed on both a first web interface via a first interface component of the first web interface and a second web interface via a second interface component of the second web interface, wherein the first interface component is a different type of interface component than the second interface component, wherein both the first web interface and the second web interface are configured to receive a changed value to replace the original value, and wherein both the first interface component and the second interface component are configured to display the changed value, received via either the first web interface or the second web interface, in place of the original value;
receive, via the first web interface, the changed value to the original value of a plurality of values displayed on the first web interface;
determine, from a data flow tracking which data of a database is used across the first web interface or the second web interface, that the original value is displayed on both the first web interface and the second web interface;
update the database based on the changed value, wherein after the updating the database includes the changed value;
identify, from the data flow, one or more devices accessing the second web interface including the first value; and
provide the changed value to the identified one or more devices accessing the second web interface including the original value, wherein the original data value in the second web interface is updated to display the changed value.

13. The system of claim 12, wherein the changed value is received based on an interaction with the first interface component configured to enable a user to adjust a prior value of the data of the data source.

14. The system of claim 13, wherein the second interface component of the second web interface is configured to adjust the data of the data source, including both the prior value prior to the receiving, or the changed value after the providing.

15. The system of claim 14, wherein the at least one processor is further configured to:
receive a second changed value to the changed value via the second interface component displayed on the second web interface;
update the data source based on the subsequent changed value; and
provide the subsequent update to the first web interface for display via the first interface component.

16. The system of claim 12, wherein the at least one processor that identifies is configured to:
identify a plurality of web sockets communicatively coupled to the data source, to which a prior value has been provided.

17. The system of claim 16, wherein the at least one processor that transmits is configured to:
provide the update to the plurality of web socket connections.

18. A non-transitory computer-readable medium having instructions stored thereon that, when executed by at least one computing device, cause the at least one computing device to perform operations comprising:
determining an original value is displayed on both a first web interface via a first interface component of the first web interface and a second web interface via a second interface component of the second web interface, wherein the first interface component is a different type of interface component than the second interface component, wherein both the first web interface and the second web interface are configured to receive a changed value to replace the original value, and wherein both the first interface component and the second interface component are configured to display the changed value, received via either the first web interface or the second web interface, in place of the original value;
receiving, via the first web interface, the changed value to the original value of a plurality of values displayed on the first web interface;
determining, from a data flow tracking which data of a database is used across the first web interface or the second web interface, that the original value is displayed on both the first web interface and the second web interface;
updating the database based on the changed value, wherein after the updating the database includes the changed value;
identifying, from the data flow, one or more devices accessing the second web interface including the first value; and
providing the changed value to the identified one or more devices accessing the second web interface including the original value, wherein the original data value in the second web interface is updated to display the changed value.

19. The non-transitory computer-readable medium of claim 18, wherein the changed value is received based on an interaction with the first interface component configured to enable a user to adjust a prior value of the data of the data source.

20. The non-transitory computer-readable medium of claim 19, wherein the second interface component of the second web interface is configured to adjust the data of the data source, including both the prior value prior to the receiving, or the changed value after the providing.

* * * * *